(12) United States Patent
Harris

(10) Patent No.: US 6,938,834 B2
(45) Date of Patent: Sep. 6, 2005

(54) IRRIGATION SYSTEM PERIPHERAL COMMUNICATIONS USING VALVE CONTROL WIRES

(76) Inventor: Steven Lee Harris, 1079 W. 350 South, Logan, UT (US) 84321

(*) Notice: Subject to any disclaimer, the term of this patent is extended or adjusted under 35 U.S.C. 154(b) by 250 days.

(21) Appl. No.: 10/083,286

(22) Filed: Feb. 26, 2002

(65) Prior Publication Data

US 2003/0160107 A1 Aug. 28, 2003

(51) Int. Cl.$^7$ ............................................. B05B 17/04
(52) U.S. Cl. ........................... 239/63; 239/67; 239/200; 239/569; 239/575
(58) Field of Search ........................... 239/63, 67, 99, 239/200, 201, 569, 575, DIG. 15

(56) References Cited

U.S. PATENT DOCUMENTS

| | | | |
|---|---|---|---|
| 3,283,316 A | * 11/1966 | Beardmore et al. | ........... 239/63 |
| 4,303,203 A | * 12/1981 | Avery | .......................... 239/728 |
| 5,040,409 A | * 8/1991 | Kiewit | ..................... 73/40.5 A |
| 5,148,985 A | 9/1992 | Bancroft | |
| 5,740,031 A | 4/1998 | Gagnon | |
| 5,813,606 A | 9/1998 | Ziff | |
| 6,016,971 A | 1/2000 | Welch | |
| 6,079,433 A | 6/2000 | Saarem | |
| 6,234,403 B1 | 5/2001 | Grott | |
| 6,252,755 B1 | 6/2001 | Willer | |
| 6,812,826 B2 | * 11/2004 | Buhler et al. | ........... 340/310.01 |

* cited by examiner

Primary Examiner—Robin O. Evans
(74) Attorney, Agent, or Firm—Brian C. Kunzler

(57) ABSTRACT

An irrigation system controller communicates with peripheral sensors using control valve wires as the medium over which to send and receive electronic signals. Various types of sensors such as soil moisture, temperature, etc., can be interfaced to this system. A sensor that is near a control valve can be connected to the control valve wires, eliminating the need to run additional sensor wires back to the controller. Installation costs are reduced because of less wire to run.

20 Claims, 4 Drawing Sheets

IRRIGATION SYSTEM PERIPHERAL COMMUNICATIONS USING VALVE CONTROL WIRES

BACKGROUND OF THE INVENTION

This invention relates to automatic irrigation systems, and specifically to a method and apparatus for communication between an irrigation controller and peripheral sensors that provide data to the irrigation controller to assist in the irrigation control process.

Electronic irrigation controllers are commonly used to automatically control irrigation of vegetation such as lawns and gardens in both commercial and residential applications. These systems generally consist of a clock with a mechanism built in for activating an irrigation system at a specified day and time and for a particular duration. Water is applied based on a set schedule, without regard to changing weather conditions. With this type of system it is common to see sprinklers operating during or after a rainstorm when irrigation is unnecessary, and valuable water is being wasted.

Some systems have been enhanced to use various sensors, most commonly soil moisture sensors, to assist in irrigation scheduling. One of the more common embodiments of this type of system uses a conventional timer to schedule irrigation cycles, but will "override" the timer and not allow it to turn on if a certain moisture level is detected in the soil. U.S. Pat. No. 5,148,985 to Bancroft discloses such a system which is applicable to the scope of this patent. When it rains or during cool weather this type of system will tend to water only when needed, thus conserving water.

One drawback of this type of system is that the sensors generally require additional wires to be run to connect them to the controller. The sensors are usually placed in the soil some distance from the controller, which substantially increases the amount of wire required for a system that uses sensors over one that does not. This difference becomes even more pronounced when upgrading a system that has a conventional timer already installed. In most cases this requires trenching in established lawn and garden areas, digging under sidewalks, drilling holes in sides of buildings, etc. to run wires for sensors which causes installation costs to be higher.

U.S. Pat. No. 5,813,606 to Ziff discloses a radio controlled sprinkler control system which overcomes the problems of additional wires required for sensor connection. However, a radio link creates a set of new problems. One of the most significant is the lack of an electrical power connection to the sensors, thus requiring that the sensors use batteries or some other self-powering means which makes this an undesirable choice for many applications.

Most electronically controlled irrigation systems use electric control valves to turn the flow of water on and off. The actuating mechanism contained within the valves generally consists of a wire wound iron core solenoid which is actuated by the magnetic field that is produced when an electric current is applied to the terminals. These solenoids are characterized by a high level of inductance, usually somewhere on the order of 70 to 100 millihenries, which can be used to advantage and provides a key element to the functionality of circuitry used in this invention. The valves are generally installed in the field, near to where moisture or other type sensors may be located. There must be means for an electrical connection between a controller and valves for the controller to initiate action within the valves, which is generally in the form of PVC insulated solid copper wires, which are often called valve control wires. These valve control wires usually contain alternating current when a valve is active, generally at a voltage of 24 VAC.

Using these valve control wires to provide electrical connection to sensors as well as valves, such that a sensor located in the vicinity of the valve could tie into the valve wires, could eliminating the need for separate wires to be run for the sensor and thus save tremendously on installation costs to upgrade existing irrigation systems. However, this presents some difficulties because the voltage to drive the valves is much higher than what is compatible with most types of sensors. Also the valve itself presents a variable load which would cause erroneous readings from most sensors if attached directly to the valve control wires. An additional difficulty is the fact that the irrigation controller usually contains a type of solid state device known as a triac to switch the voltage applied to the valves on and off. One characteristic of triacs is that a rapidly changing voltage applied to one of its terminals can cause the triac to become active or "fire" prematurely. A sensor communicating over a valve wire could cause this to happen if signals to or from the sensor are not carefully controlled. My invention provides a means to overcome these problems and limitations.

Some of the principles used in this invention are similar to those used in prior art for power line networking, such as disclosed in U.S. Pat. No. 6,252,755 to Willer. However, it is my belief that these principles have not been previously applied to the area of irrigation system peripheral communications, and further that this invention provides new and unexpected results of this technology which are not obvious to those not invoking the inventive faculty.

BRIEF SUMMARY OF THE INVENTION

This invention provides for an economical means to upgrade existing conventional timer type irrigation control systems to a system that utilizes moisture and other types of field environment sensors, which can improve irrigation scheduling. Instead of requiring that wires be run the full distance from the sensor to the controller, the sensor is merely connected to nearby valve control wires, eliminating much of the costly trenching required to upgrade a system. Another advantage is that connections are simplified at the controller. There are no additional wires to connect. The sensor signals come in on the valve control wires that are already present. A timer with a built in sensor interface does not require any additional terminal posts for the sensors. The sensor connections are simply made out in the field at nearby control valve locations.

Additional advantages and novel features of this invention will be set forth in part in the following description, and in part will become apparent to those who are skilled in the art upon examination of the following, or may be learned by practice of this invention. The advantages of this invention may be realized and attained by means of the instrumentalities and combinations particularly pointed out in the appended claims.

DETAILED DESCRIPTION OF THE INVENTION

Figure 1:
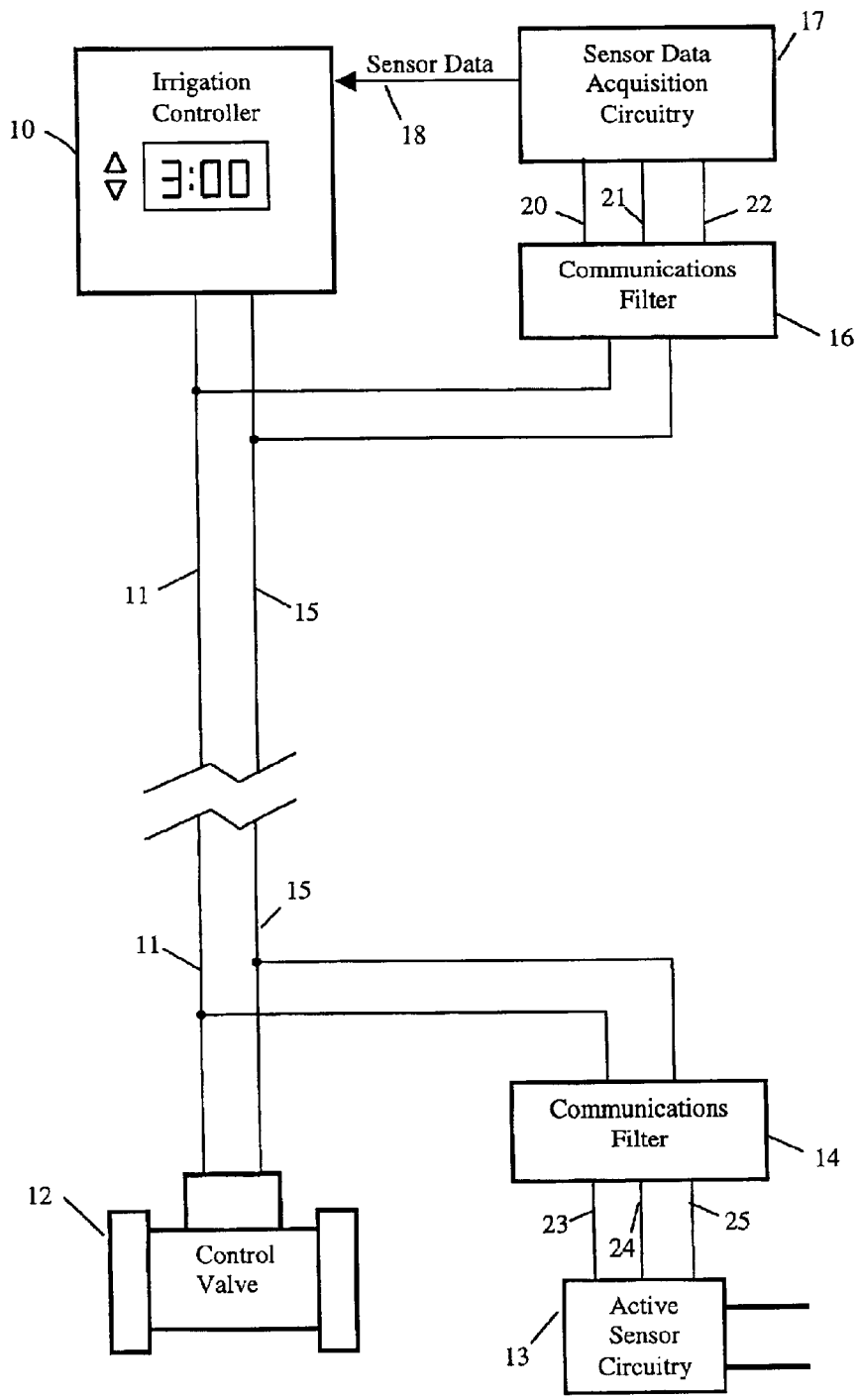
FIG. 1 is a schematic diagram of an irrigation system using this invention with an active sensor.

A typical embodiment of this invention is illustrated in FIG. 1. An irrigation controller 10 (such as a Rainbird ISA-406 which is one of a wide variety of controllers commonly available through irrigation equipment dealers) is connected to one or more control valves 12 through valve control wires 11 and 15. Only one valve is shown for clarity, additional valves may be connected in a similar fashion. A typical system will have many valves connected to one controller. Valve control wire 11 provides power, usually at 24 VAC, to actuate the valve. It is often driven by a solid state switch, known as a triac, from within controller 10. This switch causes power to be applied to wire 11 when it is time to irrigate, causing the valve to open and allowing irrigation to take place. Valve control wire 15 is the valve common connection which provides a return path for the electrical power from the valve. It is usually connected to the common node of the controller power supply. When multiple valves are connected, each valve has one unique power wire 11 to control the valve. A single common wire 15 can be shared between the valves, or each valve can have a unique common.

Out in the field near to a control valve 12, one or more communications filters 14 are electrically connected to valve control wires 11 and 15. Active sensor circuitry 13 is electrically connected to filter 14 through signals sensor transmit 23, sensor receive 24, and sensor common 25. Back at or near controller 10, which is generally some distance from control valves, a similar communications filter 16 is electrically connected to valve control wires 11 and 15. Sensor data acquisition circuitry 17 is electrically connected to filter 16 through signals data transmit 20, data receive 21, and data common 22. Data acquisition circuitry 17 can communicate digital data with active sensor 13 in a serial half-duplex fashion to obtain environmental data such as soil moisture, temperature, etc. Circuitry 17 can then communicate this sensor data 18 to controller 10 using a variety of methods which one skilled in the art can easily implement. For example, circuitry 17 may send digital sensor data directly to the microprocessor of controller 10 to assist in scheduling irrigation cycles. Another method could involve circuitry 17 controlling a make or break switch on the valve common connection 15 to override irrigation controller 10 when necessary.

Figure 2:
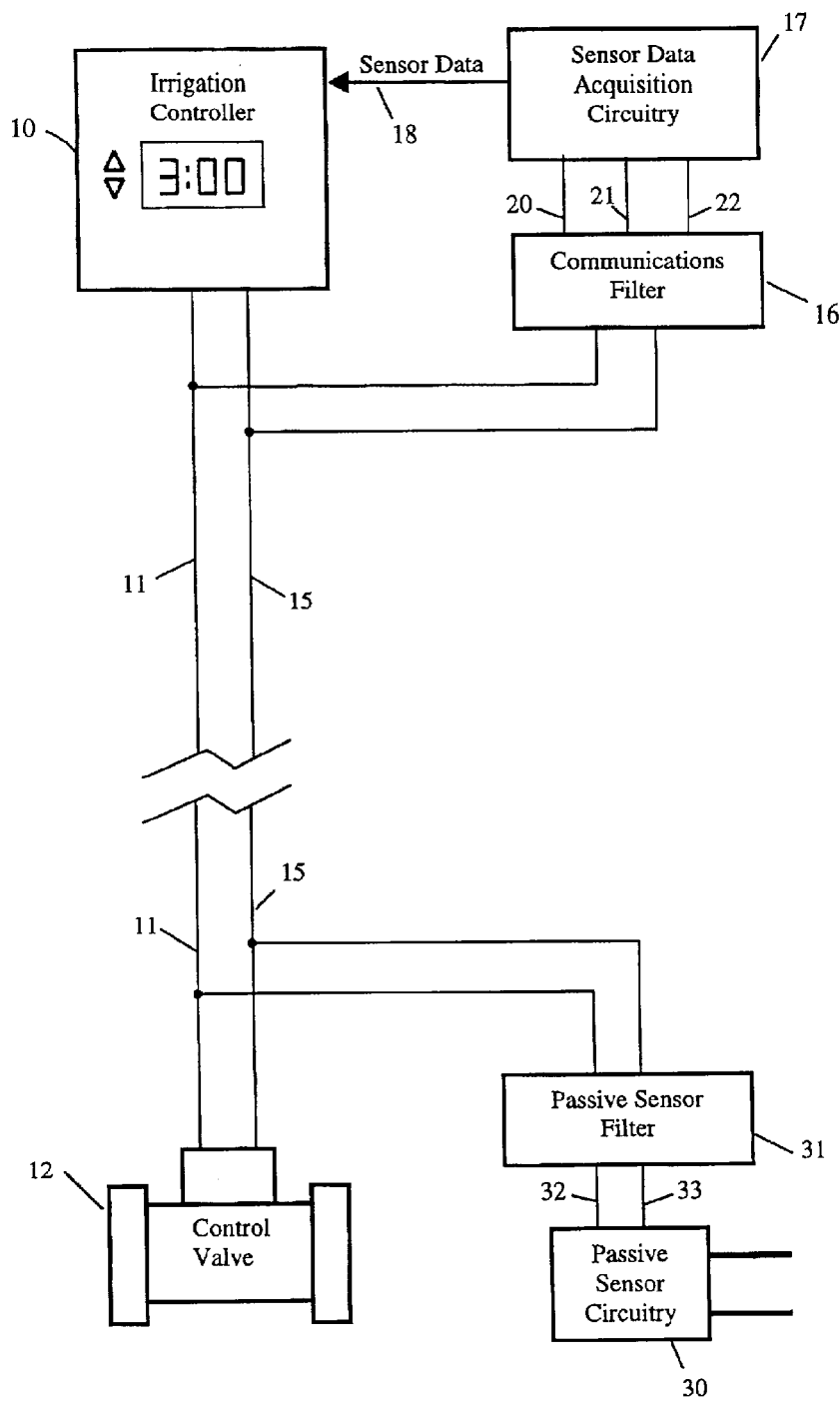
FIG. 2 is a schematic diagram of an irrigation system using this invention with a passive sensor.

FIG. 2 discloses an alternative embodiment of this invention, which can be a more cost effective implementation for interfacing with passive resistive type sensors, such as resistive soil moisture sensors. These sensors appear electrically as a simple resistance which varies with the property being measured. For example, a resistive soil moisture sensor will increase in resistance as the soil dries out. The system of FIG. 2 is identical to that of FIG. 1 with the exception that the active sensor 13 and filter 14 are replaced by the passive sensor 30 and passive sensor filter 31. The resistive element of passive sensor 30 is connected across terminals 32 and 33 of passive filter 31.

Instead of digital half-duplex serial communications, the system of FIG. 2 uses an analog stimulus signal sent out by data acquisition circuit 17 through terminal 20 of filter 16 to excite the passive sensor 30. Circuit 17 then uses an analog to digital converter to sample the analog signal returned from sensor 30 through filters 31 and 16 through terminal 21. Terminal 22 of filter 16 is again the common connection between filter 16 and data acquisition circuit 17.

Figure 3:
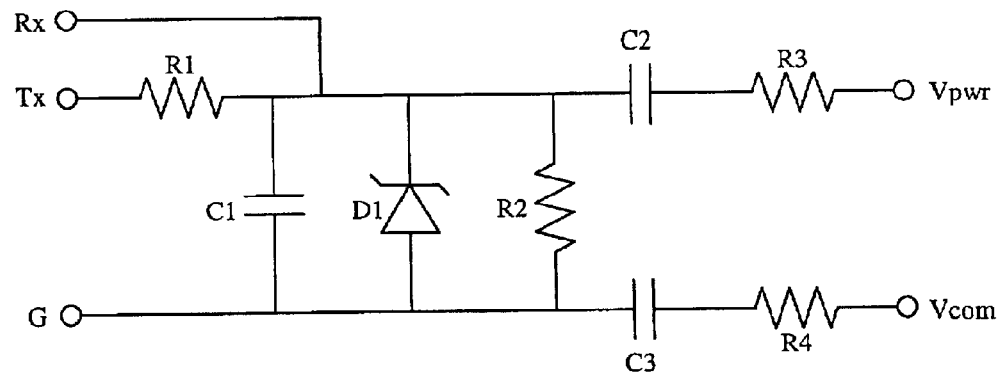
FIG. 3 is a schematic diagram of the preferred embodiment of communications filtering and isolation circuitry used in this invention.

FIG. 3 is a schematic diagram illustrating in detail the dual communications filters 14 and 16 of FIG. 1 and the single communications filter 16 of FIG. 2 according to a particular embodiment of this invention. Referring to the connection of FIG. 2, terminal Vpwr is connected to power valve control wire 11. Terminal Vcom is connected to common valve control wire 15. Terminal Rx is the data receive signal 21. Terminal Tx is the data transmit signal 20. Terminal G is the data common signal 22. Similar connections are used in FIG. 1 for both filters 14 and 16.

Resistor R1 and capacitor C1 form a low pass filter to prevent misfiring of triacs which may be used in controller 10 by filtering high frequency signals which can cause misfiring. Also, for the passive sensor system in FIG. 2, R1 provides a reference resistor which creates a voltage divider with the resistive sensor and allows the resistance of the sensor to be determined.

Components R2, R3, R4, C2, and C3 provide a high pass filter to isolate sensitive components from potentially harmful 24 VAC signals used to drive control valves 12, which are at a frequency of 50 or 60 Hz. Diode D1 along with resistors R3 and R4 provide overvoltage protection from transient voltage spikes and ac currents, as well as negative voltage protection from the discharge currents of capacitors C2 and C3 so that these filters may be used in single supply systems.

Component values for this embodiment of the present invention shown in FIG. 3 are as follows: R1 is 1.0 kilo ohms with 1% tolerance. C1 is 1000 pico farads. D1 is a 4.7 volt zener diode. R2 is 10 kilo ohms with 1% tolerance. C2 and C3 are 0.33 micro farads, 50 volt capacitors. The peak voltage of a 24 VAC signal can be close to 40 volts, thus a 50 volt rating on the capacitors should be considered a minimum. R3 and R4 are 47 ohms.

Figure 4:
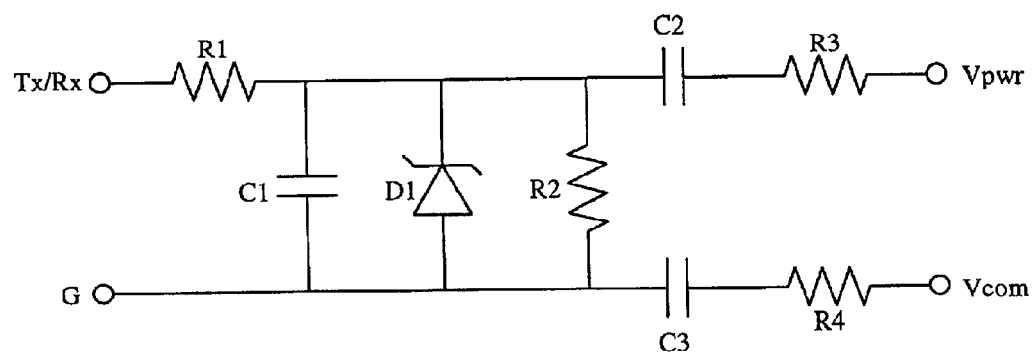
FIG. 4 is a schematic diagram of an alternative embodiment of the communications filtering and isolation circuitry used in this invention.

FIG. 4 is a schematic diagram illustrating in detail an alternative embodiment of dual communications filters 14 and 16. The circuits of FIGS. 3 and 4 are identical except that in FIG. 4 the receive terminal has been combined with the transmit terminal so that only four connections are required. This embodiment is easily accommodated by those skilled in the art using modern microprocessor technology, by connecting to a processor pin which has both input and tri-state output functionality.

Figure 5:
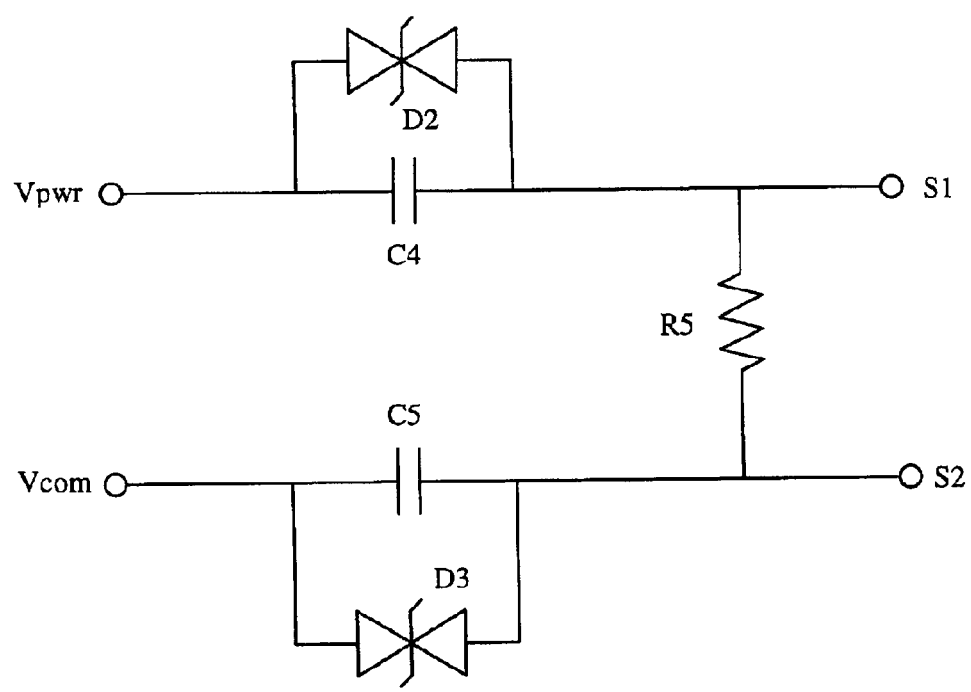
FIG. 5 is a schematic diagram of the passive sensor filtering and isolation circuitry used in this invention for connecting to a passive sensor.

FIG. 5 is a schematic diagram illustrating in detail the passive sensor filter 31 of FIG. 2 according to a particular embodiment of this invention. Referring to the connections of FIG. 2, terminal Vpwr is connected to power valve control wire 11. Terminal Vcom is connected to common valve control wire 15. Terminals S1 and S2 are connected across variable resistance sensor 30.

Components C4, C5, and R5 provide a high pass filter to isolate the passive sensor from potentially harmful 24 VAC/ 50 to 60 Hz signals used to drive control valves 12. D2 and D3 are bi-directional transient voltage suppressors to protect capacitors C4 and C5 from transient voltage spikes, which can occur on the long runs of wire used in an irrigation control system.

Component values for this embodiment of the present invention shown in FIG. 4 are as follows: C4 and C5 are 0.33 micro farads, 63 volt capacitors. R5 is 10 kilo ohms. D2 and D3 are 51 volt transient voltage suppressors (available from Diodes Inc., Westlake Village, Calif. part number P6KE51CA).

In the embodiment of FIG. 1, the active sensor 13 and data acquisition circuit 17 are microprocessor-based devices operating from a single 5 volt supply. In the half-duplex mode of operation the data acquisition circuit 17 acts as master and the sensors 13 act as slaves. The master transmits a query to one of the slaves, which in turn transmits information back to the master. The slaves are set to receive mode while waiting for a transmission from the master by setting the transmit signal to a high impedance state and monitoring the receive signal. When a slave receives a query, it responds by enabling the transmit signal while at the same time the master is put into receive mode. When the slave is finished transmitting, it immediately returns to receive mode to allow the master to resume control of the communication lines.

In the embodiment of FIG. 1 it is possible for data acquisition circuit 17 to transmit power as well as data signals to active sensors 13. The sensors can recover dc power from the transmitted ac signals by performing either half or full wave rectification on the signals.

There are a wide variety of serial communication protocols which may be implemented. The determination of protocol is largely dependent on the construction of sensor circuitry 13 and data acquisition circuitry 17, and is left to the discretion of the system designer who desires to use this invention. Common encoding techniques used by those skilled in the art such as Manchester encoding, which is used in ethernet 10 base-T networking, will provide acceptable performance, however there are some drawbacks to this type of encoding technique as discussed below. One limitation of filters 14 and 16 are that a non-zero signal level applied for a duration of more than approximately 100 micro-seconds will charge filter capacitors C2 and C3 sufficiently such that the sensitivity of the circuit to receive signals will be significantly degraded. This means that a protocol where the voltage level can remain at a logic '1' for several bit periods, such as with a standard 16C550 compatible uart used in RS-232 communications, is not suitable for this circuit.

In the embodiment of FIG. 1, given that the inductance associated with most control valves 12 is around 70 to 100 millihenries, it has been found that a signal high pulse width of between 10 and 30 microseconds gives the best results. If using Manchester encoding this translates to a maximum baud rate of 100 KHz. Because of the potential for undesirable radio frequency emissions, combined with the fact that most sensors need transmit only a small amount of data, it is suggested that a slower encoding scheme where only a single bit is transmitted at a time with a delay between each bit be used. This type of encoding has been found to work well and is described as follows:

The data line is normally driven low by the transmitting device. It is set to a high impedance state on the receiving devices. To transmit a zero, the line is driven high for 10 microseconds and then driven low. To transmit a one, the line is driven high for 30 microseconds and then driven low. There is a rest period between each bit transmission where the line remains at a low logic state for 6 milliseconds. At the receiving end, when a rising edge is detected a timer is started. The line is then sampled 20 microseconds after the edge to obtain the bit value, and then again at 40 microseconds to validate that the line went low again. To implement half-duplex communications, when all data bits to query a certain sensor have been transmitted, the master tri-states the transmit line and waits for the sensor which was queried to respond by driving the line. When the sensor is finished transmitting data, it tri-states the transmit line, after which the cycle will repeat. This encoding scheme will give a maximum data transfer rate of about 166 bits/second, which is more than adequate for most irrigation related sensors.

In the embodiment of FIG. 2 the data acquisition circuit 17 is microprocessor-based, and contains a high speed analog to digital converter and operates from a single 5 volt supply. Circuit 17 sends out a digital pulse of 5 volt magnitude and a duration of 30 microseconds on data transmit line 20 which is connected to the Tx terminal of FIG. 3.

Throughout the duration of the digital pulse the analog to digital converter takes samples from data receive line 21 which is connected to the Rx terminal of FIG. 3. Different resistance values at passive sensor 30 will cause different waveforms on data receive line 21 because of the voltage divider set up between R1 of FIG. 3 and the sensor. The effects of the filter capacitors coupled with the inductance of the control valve 12 solenoid causes some non-linearities and distortion in the received waveforms. Different sensors can be modeled and algorithms developed to convert the waveforms into sensor readings. These algorithms can then be programmed into the microprocessor of data acquisition circuit 17.

In practice, most environmental conditions which are measured by the passive sensor 30 change very slowly. Therefore the sensor need only be sampled occasionally to maintain accurate environmental data. Usually some averaging is performed on multiple readings to reduce the effect of noise in the system, however even when many readings are averaged it is still necessary to only sample the sensors occasionally, such as once every few seconds. By increasing the time between samples, the radio frequency emissions of the system will be reduced, thereby reducing the likelihood that the system will cause undesirable interference with electronic communications equipment.

While this invention has been described in connection with what is presently considered to be the most practical and preferred embodiments, it is to be understood that the invention is not limited to the disclosed embodiments, but is intended to cover various modifications and equivalent arrangements included within the spirit and scope of the appended claims.

I claim:

1. An apparatus for passing electrical communication signals over valve control wires in an electronic irrigation system between a master data acquisition circuit and at least one sensor circuits comprising:
   (a) an electronic irrigation controller for controlling the application of irrigation fluid over a given area;
   (b) at least one control valve driven by electrical current from said irrigation controller to control the flow of irrigation fluid to at least one dispersion nozzle;
   (c) an electrical connection between said irrigation contol means and said control valve for use in applying power to said control valves;
   (d) a first communications filter circuitry coupled to said electrical connection and located in the vicinity of said irrigation control; and
   (e) a second communications filter circuitry coupled to said electrical connection and located in the vicinity of where said irrigation fluid is dispersed.

2. The apparatus of claim 1 wherein the first and second communication filters provides isolation from electrical voltages and currents used to power said control valve, comprising at least one capacitors configured to form a high pass filter which disallows the passage of valve power signals, yet allows higher frequency communication signals to pass through.

3. The apparatus of claim 2 wherein the first and second communication filter circuits contain slew rate limiting circuitry, comprising a resistor and capacitor configured as a low pass filter, to prevent misfiring of solid state triac devices which may be used in said irrigation control means.

4. The apparatus of claim 2 wherein the first and second communication filter circuits contain at least one diode for overvoltage and undervoltage protection of said data acquisition circuit and said sensor circuits.

5. The apparatus of claim 2 wherein the first and second instances of said communication filter circuits contain at least four terminals, two being connected to valve control wires, and two connected to sensor or data acquisition circuitry.

6. The apparatus of claim 1 wherein said electrical communication signals use a slow speed single bit encoding scheme to reduce the level of radio frequency emissions which may be generated during operation.

7. The apparatus of claim 1, further comprising an active sensor coupled to the electrical connection and located in a vicinity of where the irrigation fluid is dispersed.

8. The apparatus of claim 1, further comprising a passive sensor coupled to the electrical connection and located near where the irrigation fluid is dispersed.

9. An apparatus for passing electrical communication signals over valve control wires in an electronic irrigation system between a data acquisition circuit and at least one passive sensor circuits comprising:
  (a) an electronic irrigation contoller for controlling the application of irrigation fluid over a given area;
  (b) at least one control valve driven by electrical current from said irrigation controller to control the flow of irrigation fluid to at least one dispersion nozzle;
  (c) electrical connection between said irrigation contoller and said control valve for use in applying power to said control valves;
  (d) a first communications filter circuitry coupled to said electrical connection and located in the vicinity of said irrigation controller; and
  (e) a second communication filter circuitry coupled to said electrical connection and to a passive sensor and located near where said irrigation fluid is dispersed.

10. The apparatus of claim 9 wherein said first and second communications filter circuitry provides isolation from electrical voltages and currents used to power said control valve, comprising at least one capacitors configured to form a high pass filter which disallows the passage of valve power signals, yet allows higher frequency communication signals to pass through.

11. The apparatus of claim 10 wherein said second communications filter circuitry provides isolation from electrical voltages and currents used to power said control valve, comprising first and second capacitors and a resistor configured to form a high pass filter which disallows the passage of valve power signals, yet allows higher frequency communication signals to pass through.

12. The apparatus of claim 10 wherein said first communications filter circuitry contains slew rate limiting circuitry, comprising a resistor and capacitor configured as a low pass filter, to prevent misfiring of solid state triac devices which may be used in said irrigation control means.

13. The apparatus of claim 12 wherein said first communications filter circuitry contains at least one diode for overvoltage and undervoltage protection of said data acquisition circuit.

14. The apparatus of claim 9 wherein said electrical communication signals are not transmitted continuously, but are intermittent with a period of time between each transmission sufficient to reduce to an acceptable level the radio frequency emissions which may be generated during operation.

15. A method for passing electrical communication signals over valve control wires in an electric irrigation system between a master data acquisition circuit and at least one sensor circuits comprising:
  providing an electric irrigation controller for controlling the application of irrigation fluid over a given area;
  providing at least one control valve driven by electrical current from said irrigation controller to control the flow of irrigation fluid to at least one dispersion nozzle; and
  providing an electrical connection between said irrigation control means and said control valve for use in applying power to said control valves; said connection usually consisting of solid copper wire; and
  providing a first instance of communications filter circuitry coupled to said electrical connection and located in the vicinity of said irrigation control means; and
  providing a second instance of communications filter circuitry coupled to said electrical connection and located in the vicinity of where said irrigation fluid is dispersed.

16. The method of claim 15, further comprising:
  (a) providing a stimulus signal which is passed through a series resistor for the purpose of creating a voltage divider with said resistive sensor; and
  (b) passing said signal through an isolation filter to said valve control wires, said isolation filter having first and second series capacitors configured to form a high pass filter for isolation from power voltages which may exist on valve control wires; and
  (c) said stimulus signal is digital pulse of the proper magnitude and duration such that when it is passed to said valve control wires, the control valve which is connected in parallel briefly appears as a high impedance, such that for a small instant of time a voltage divider is created between the series resistor and resistive sensor; and
  (d) a high speed analog to digital converter is used to obtain a digital value of the voltage level that briefly exists in said voltage divider, further that said digital value is proportional to resistance level of said sensor, whereby the resistance level of the sensor can be mathematically derived.

17. The method of claim 16, wherein said passive resistive sensor is connected to said valve control wires through an isolation filter having first and second series capacitors configured to form a high pass filter for isolation from power voltages which may exist on valve control wires.

18. The method of claim 16, wherein said series resistor is connected with a capacitor in parallel to form a low pass filter, whereby the slew rate of said digital pulse is limited to less than 1 volt per microsecond to protect against premature firing of solid state triac devices generally used in irrigation control system.

19. The method of claim 16, wherein the magnitude and duration of said digital pulse is around 15 volts and 30 microseconds, respectively.

20. The method of claim 16, wherein said stimulus signal is applied only intermittently, with a period of time between each stimulus signal, sufficient to reduce to an acceptable level the radio frequency emissions which may be generated during operation.

* * * * *